(12) United States Patent
Jiang

(10) Patent No.: US 12,169,253 B2
(45) Date of Patent: *Dec. 17, 2024

(54) LIDAR RECEIVING APPARATUS, LIDAR SYSTEM AND LASER RANGING METHOD

(71) Applicant: SUTENG INNOVATION TECHNOLOGY CO., LTD., Shenzhen (CN)

(72) Inventor: Shen Jiang, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/235,877

(22) Filed: Aug. 20, 2023

(65) Prior Publication Data

US 2023/0400558 A1 Dec. 14, 2023

Related U.S. Application Data

(63) Continuation of application No. 17/264,544, filed as application No. PCT/CN2020/080350 on Mar. 20, 2020, now Pat. No. 11,768,278.

(30) Foreign Application Priority Data

Jun. 28, 2019 (CN) .......................... 201910576631.0

(51) Int. Cl.
  *G01S 7/48* (2006.01)
  *G01S 7/4861* (2020.01)
  (Continued)

(52) U.S. Cl.
  CPC ............ *G01S 7/4861* (2013.01); *G01S 7/487* (2013.01); *G01S 7/489* (2013.01); *G01S 17/10* (2013.01)

(58) Field of Classification Search
  None
  See application file for complete search history.

(56) References Cited

U.S. PATENT DOCUMENTS

| 9,869,754 B1 | 1/2018 | Campbell et al. |
| 2012/0261516 A1* | 10/2012 | Gilliland ................ B64G 1/646 |
| | | 356/4.01 |

(Continued)

FOREIGN PATENT DOCUMENTS

| CN | 1548985 A | 11/2004 |
| CN | 104049193 A | 9/2014 |

(Continued)

OTHER PUBLICATIONS

International Search Report issued in corresponding International Application No. PCT/CN2020/080350, mailed Jun. 17, 2020, 5 pages.

(Continued)

*Primary Examiner* — Hovhannes Baghdasaryan
(74) *Attorney, Agent, or Firm* — BAYES PLLC

(57) ABSTRACT

The present application provides a lidar receiving apparatus, a lidar system, a laser ranging method, a laser ranging controller, and a computer readable storage medium. The lidar receiving apparatus includes: a photodetector, which is configured to receive a reflected laser signal and to convert the reflected laser signal into a current signal when a bias voltage of the photodetector is greater than a breakdown voltage of the same; a ranging circuit, which is connected with the photodetector and configured to calculate distance data according to the current signal; and a power control circuit, which is connected with the photodetector and configured to control the bias voltage applied to the photodetector according to a predefined rule.

10 Claims, 13 Drawing Sheets

(51) Int. Cl.
  *G01S 7/487* (2006.01)
  *G01S 7/489* (2006.01)
  *G01S 17/10* (2020.01)

(56) References Cited

U.S. PATENT DOCUMENTS

| | | |
|---|---|---|
| 2017/0038464 A1 | 2/2017 | Campbell et al. |
| 2019/0187256 A1 | 6/2019 | Wang |
| 2019/0250257 A1 | 8/2019 | Finkelstein et al. |

FOREIGN PATENT DOCUMENTS

| | | |
|---|---|---|
| CN | 204989468 U | 1/2016 |
| CN | 106054205 A | 10/2016 |
| CN | 106093958 A | 11/2016 |
| CN | 107450081 A | 12/2017 |
| CN | 207181672 U | 4/2018 |
| CN | 108279407 A | 7/2018 |
| CN | 108303690 A | 7/2018 |
| CN | 207601308 U | 7/2018 |
| CN | 108387886 A | 8/2018 |
| CN | 108627813 A | 10/2018 |
| CN | 110244311 A | 9/2019 |
| CN | 209387867 U | 9/2019 |
| DE | 202013101039 U1 | 3/2014 |
| JP | 2016133341 A | 7/2016 |

OTHER PUBLICATIONS

European Search Report issued in related European Application No. EP20830873.4, mailed Aug. 22, 2022, 10 pages.

First Office Action issued in related Chinese Application No. 201910576631.0, mailed Nov. 4, 2020, 10 pages.

* cited by examiner

LIDAR RECEIVING APPARATUS, LIDAR SYSTEM AND LASER RANGING METHOD

CROSS-REFERENCE TO RELATED APPLICATIONS

The present application is a continuation of U.S. patent application Ser. No. 17/264,544 filed on Jan. 29, 2021, which is a national stage of International Application No. PCT/CN2020/080350, filed on Mar. 20, 2020, which claims the benefit of priority to China Patent Application No. 201910576631.0, filed on Jun. 28, 2019, the content of which are incorporated herein by references in their entireties.

TECHNICAL FIELD

The present application relates to the field of lidar technology, and particularly to a lidar receiving apparatus, a lidar system, a laser ranging method, a laser ranging controller and a computer readable storage medium.

BACKGROUND

A lidar system is increasingly applied to application scenarios such as autonomous driving.

However, in a lidar system, due to optical design limitations, transmitted light (laser signal) may be directly reflected to a receiver via the inner wall of a lens barrel or via impurities on the lens, forming a false reflected signal. For a photodetector with a relatively long recovery time, no real echo may be observed for a time period thereafter, and there will be a certain range of blind areas.

However, it is difficult for a traditional lidar to solve the above-mentioned problem of the short-range blind areas.

SUMMARY

Accordingly, it is necessary to provide a lidar receiving apparatus, a lidar system, a laser ranging method, a laser ranging controller and a computer readable storage medium capable of decreasing a short-range blind area in view of the above technical problems.

In a first aspect, a lidar receiving apparatus includes:
a photodetector, which is configured to receive a reflected laser signal, and to convert the reflected laser signal into a current signal when a bias voltage of the photodetector is greater than a breakdown voltage of the same;
a ranging circuit, which is connected with the photodetector, and configured to calculate distance data according to the current signal;
a power control circuit, which is connected with the photodetector, and configured to control the bias voltage applied to the photodetector according to a predefined rule;
wherein the predefined rule includes: at a receiving time of a stray reflected signal, the bias voltage of the photodetector is smaller than the breakdown voltage; and the receiving time of the stray reflected signal is a time at which a transmitted laser signal reaches the photodetector through a stray light path other than a ranging light path, and is correlated to a preset flight time of the stray reflected signal.

In one embodiment, the ranging circuit includes:
a trans-impedance amplifying circuit, which is connected with the photodetector, and configured to convert the current signal into a voltage signal and amplify the voltage signal to acquire an amplified voltage signal; and
a first processing circuit, which is connected with the trans-impedance amplifying circuit, and configured to control the bias voltage applied to the photodetector according to the predefined rule, and calculate distance data according to the amplified voltage signal.

In one embodiment, the lidar receiving apparatus further includes a reference photodetector, wherein the reference photodetector is in a light-shielded state, and is connected in parallel with the photodetector;
the ranging circuit includes:
a cancelling and trans-impedance amplifying circuit, which is connected with the photodetector and the reference photodetector, respectively, and configured to perform cancellation and trans-impedance amplification on both current signals output from the photodetector and the reference photodetector and output voltage signals obtained after the cancellation and the trans-impedance amplification are performed, wherein the current signal output from the reference photodetector is positively correlated to the bias voltage applied to the reference photodetector; and
a second processing circuit, which is connected with the cancelling and trans-impedance amplifying circuit, and configured to control the bias voltage applied to the photodetector according to the predefined rule and calculate the distance data according to the voltage signal obtained after the cancellation and the trans-impedance amplification are performed.

In one embodiment, the cancelling and trans-impedance amplifying circuit includes:
a first cancelling circuit, which is connected with the photodetector and the reference photodetector, respectively, and configured to cancel both current signals output from the photodetector and the reference photodetector and output cancelled current signals;
a first trans-impedance amplifying circuit, which is connected with the first cancelling circuit, and configured to convert the cancelled current signals into voltage signals and amplify the voltage signals to acquire amplified voltage signals.

In one embodiment, the cancelling and trans-impedance amplifying circuit includes:
a second trans-impedance amplifying circuit, which is connected with the photodetector and the reference photodetector, respectively, and configured to convert both current signals output from the photodetector and the reference photodetector into voltage signals, respectively, and amplify the voltage signals to acquire two amplified voltage signals; and
a second cancelling circuit, which is connected with the second trans-impedance amplifying circuit, and configured to cancel the two amplified voltage signals and output cancelled voltage signals.

In one embodiment, the ranging circuit is configured to control the bias voltage applied to the photodetector so that it is smaller than the breakdown voltage within a first preset time period between a transmitting time and an initial time, wherein the transmitting time is a transmitting time of a transmitted laser signal, the initial time is after the receiving time of the stray reflected signal, and the first preset time period is a time period including the receiving time of the stray reflected signal.

In one embodiment, the ranging circuit is further configured to boost the bias voltage applied to the photodetector within a second preset time period between the initial time and a first time, with a boosting gradient greater than a preset gradient, and the second preset time period is a boosting time period of the bias voltage.

In one embodiment, the ranging circuit is further configured to: in a third preset time period between the first time and a second time, determine a value of a bias voltage corresponding to a current time according to a preset correspondence relationship between a receiving time of the reflected laser signal and the bias voltage, and control the bias voltage applied to the photodetector according to the value of the bias voltage corresponding to the current time, wherein the preset correspondence relationship between the receiving time of the reflected laser signal and the bias voltage is determined according to a preset correspondence relationship between a ranging flight time and a gain of the photodetector and a preset correspondence relationship between a gain of the photodetector and the bias voltage, and the third preset time period is a ranging time period.

In one embodiment, when the transmitted laser signal is a pulse signal, the ranging circuit is configured to output a control signal according to a predefined rule, and control a pulse bias voltage to be applied to the photodetector through the control signal In one embodiment, a preset flight time of the stray reflected signal is a statistical value of multiple measurement values of a flight time in a process in which the transmitted laser signal reaches the photodetector through the stray light path other than the ranging light path.

In one embodiment, the apparatus further includes:
a power module, which is connected with the photodetector and the power control circuit, respectively, and configured to receive a control signal transmitted from the power control circuit and apply a bias voltage corresponding to the control signal to the photodetector.

In a second aspect, a lidar system includes a lidar transmitting apparatus configured to transmit a laser signal, and the above-mentioned lidar receiving apparatus.

In a third aspect, a laser ranging method includes:
transmitting a laser signal;
controlling a bias voltage of a photodetector according to a predefined rule;
acquiring a current signal output from the photodetector when the bias voltage of the photodetector is greater than a breakdown voltage of the same, wherein the current signal is correlated to a reflected laser signal corresponding to the transmitted laser signal; and
calculating distance data according to the current signal, wherein the predefined rule includes: at a receiving time of a stray reflected signal, the bias voltage of the photodetector is smaller than the breakdown voltage; and the receiving time of the stray reflected signal is a time at which the transmitted laser signal reaches the photodetector through a stray light path other than a ranging light path, and is correlated to a preset flight time of the stray reflected signal.

In one embodiment, the calculating the distance data according to the current signal includes:
converting the current signal into a voltage signal and amplifying the voltage signal to acquire an amplified voltage signal; and
calculating distance data according to the amplified voltage signal.

In one embodiment, the method further includes:
acquiring a current signal output from the reference photodetector while acquiring a current signal output from the photodetector, wherein the reference photodetector is in a light-shielded state and associated with the photodetector, and the current signal output from the reference photodetector is positively correlated to the bias voltage of the reference photodetector;
the calculating the distance data according to the current signal includes:
performing cancellation and trans-impedance amplification on both current signals output from the photodetector and the reference photodetector, and outputting voltage signals obtained after the cancellation and the trans-impedance amplification are performed; and
calculating distance data according to the voltage signal obtained after the cancellation and the trans-impedance amplification are performed.

In a fourth aspect, a laser ranging controller includes a memory and a processor. The memory stores a computer program, and the processor implements the following steps when executing the computer program:
transmitting a laser signal;
controlling a bias voltage of a photodetector according to a predefined rule;
acquiring a current signal output from the photodetector when the bias voltage of the photodetector is greater than a breakdown voltage of the same, wherein the current signal is correlated to a reflected laser signal corresponding to the transmitted laser signal;
calculating distance data according to the current signal, wherein the predefined rule includes: at a receiving time of the stray reflected signal, the bias voltage of the photodetector is smaller than the breakdown voltage; and the receiving time of the stray reflected signal is a time at which the transmitted laser signal reaches the photodetector through a stray light path other than a ranging light path, and is correlated to a preset flight time of the stray reflected signal.

In a fifth aspect, a computer readable storage medium stores a computer program thereon, wherein the computer program implements the following steps when being executed by a processor:
transmitting a laser signal;
controlling a bias voltage of a photodetector according to a predefined rule;
acquiring a current signal output from the photodetector when the bias voltage of the photodetector is greater than a breakdown voltage of the same, wherein the current signal is correlated to a reflected laser signal corresponding to the transmitted laser signal;
calculating distance data according to the current signal, wherein the predefined rule includes: at a receiving time of a stray reflected signal, the bias voltage of the photodetector is smaller than the breakdown voltage; and the receiving time of the stray reflected signal is a time at which the transmitted laser signal reaches the photodetector through a stray light path other than a ranging light path, and is correlated to a preset flight time of the stray reflected signal.

In the lidar receiving apparatus, the lidar system, the laser ranging method, the laser ranging controller, and the computer readable storage medium, at the receiving time of the stray reflected signal, the power control circuit may control the bias voltage of the photodetector so that it is smaller than the breakdown voltage, such that the stray reflected signal is unable to excite the photodetector, and there is no need for recovery time for the photodetector. Even if the flight time of the reflected laser signal is short during near ranging, the photodetector is in a normal working state and the bias voltage is greater than the breakdown voltage; accordingly, the reflected laser signal may excite the photodetector, and the photodetector generates a current signal corresponding to the reflected laser signal. Therefore, the ranging circuit may calculate the distance data according to the current signal. The short-range blind area is reduced. It should be understood that the close-range blind area is theoretically an optical path length of the stray light path in the order of centimeters. As to the entire system, in consideration of the optical path length from a laser transmitted portion to the entire casing, theoretically a non-blind detection area may be realized at a system level.

DETAILED DESCRIPTION

In order to make the objective, the technical solution and the advantages of the present application apparent, the present application will be described in detail with reference to accompanying drawings and embodiments. It should be understood that specific embodiments described herein are only for describing the present application, but not for limiting the present application.

Figure 1:
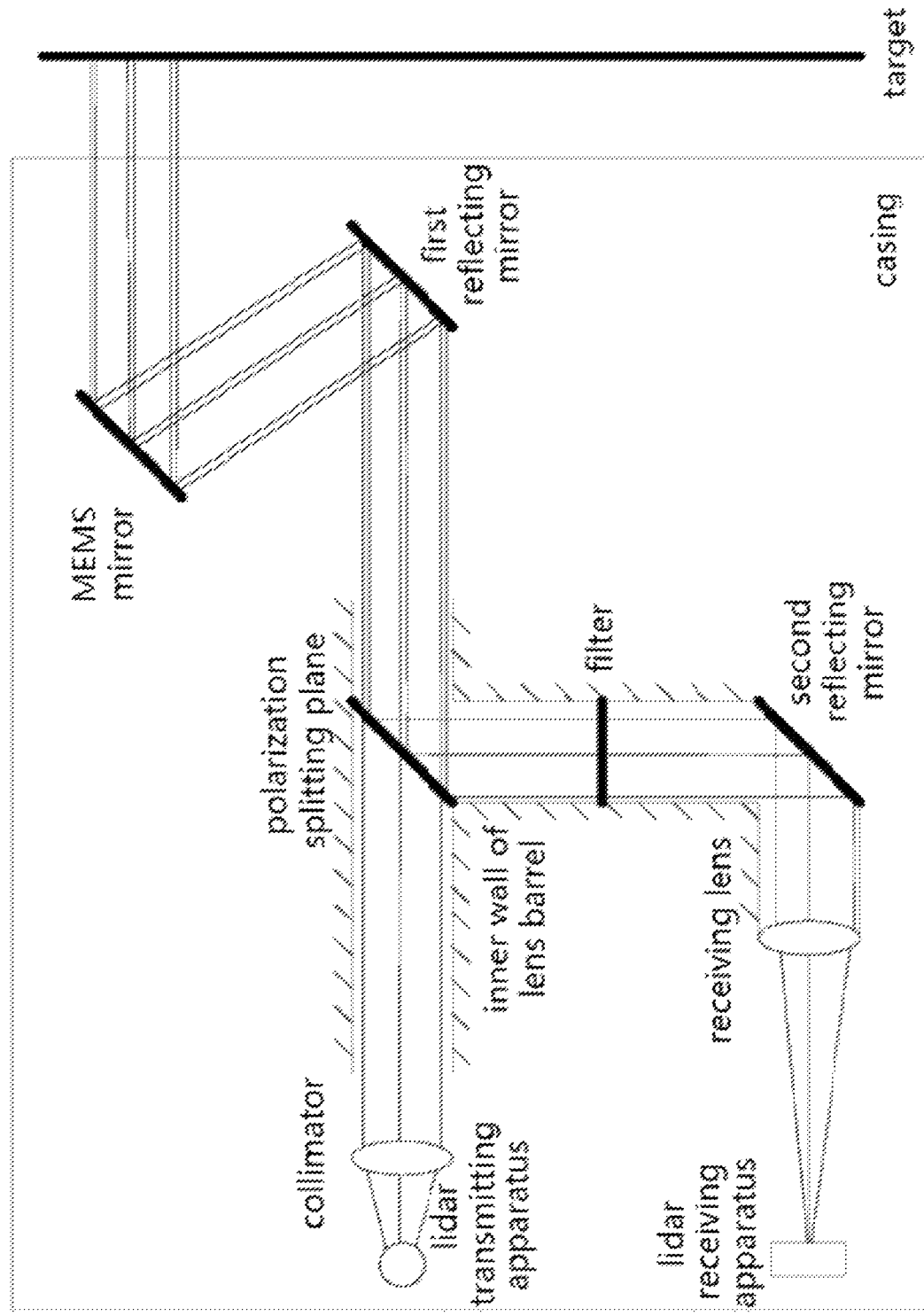
FIG. 1 is a diagram showing an application environment of a lidar receiving apparatus according to an embodiment.

A lidar receiving apparatus provided in the present application may be applied to a lidar system as shown in FIG. 1. Among them, a lidar transmitting apparatus transmits a transmitted laser signal (light), and the laser light is collimated by a collimator. The collimated laser light enters a lens barrel and is split by a polarization splitting plane to obtain a laser light which is in a polarized state and is transmitted through the polarization splitting plane. The laser light is reflected by a first reflecting mirror to a MEMS (micro electromechanical system) mirror. A scanning frequency and a scanning direction of the laser light are adjusted by the MEMS mirror to realize the scanning of the target. A reflected laser signal reflected by the target is reflected to the first reflecting mirror. Meanwhile, the reflected laser signal is reflected to the polarization splitting plane by the first reflecting mirror. The reflected laser signal is reflected to a filter by the polarization splitting plane. A clutter signal is filtered out by the filter to acquire a filtered reflected laser signal. Meanwhile, the filtered reflected laser signal is reflected to a receiving lens by a second reflecting mirror. The reflected laser signal is detected and ranged by the lidar receiving apparatus to acquire distance data.

However, in addition to the above-mentioned ranging optical path, due to lens impurities, vertical errors and parallel errors of the inner wall of a lens barrel, and the like, the transmitted laser signal may be reflected by the inner wall of the lens barrel to the lidar receiving apparatus, that is, may reach a photodetector along a stray light path other than a ranging light path, wherein a signal in which the transmitted laser signal reaches the photodetector along the stray light path may be referred to as the stray reflected signal. Due to a short optical path length of the stray reflected signal relative to the reflected laser signal, the photodetector in the traditional lidar receiving apparatus will first detect the stray reflected signal, but there is a recovery time after the photodetector detects the stray reflected signal, and the reflected laser signal cannot be detected within the recovery time. During near ranging, due to short flight time, when the reflected laser signal reaches the photodetector, the photodetector may still be within the recovery time, that is, may not detect the reflected laser signal for a to-be-ranged target. Accordingly, a certain range of short-range blind areas may be caused. Correspondingly, the lidar receiving apparatus of this embodiment may solve the above-mentioned problem of the short-range blind areas.

It should be noted that the lidar receiving apparatus of this embodiment may be applied not only to a ranging system as shown in FIG. 1 described above, but also to other ranging systems. The lidar receiving apparatus may perform ranging by adopting a polarized light or a common laser light. In addition, the lidar receiving apparatus of this embodiment may be applied to other lidar systems such as a vehicle-mounted lidar, and not limited to the ranging system.

Figure 2A:
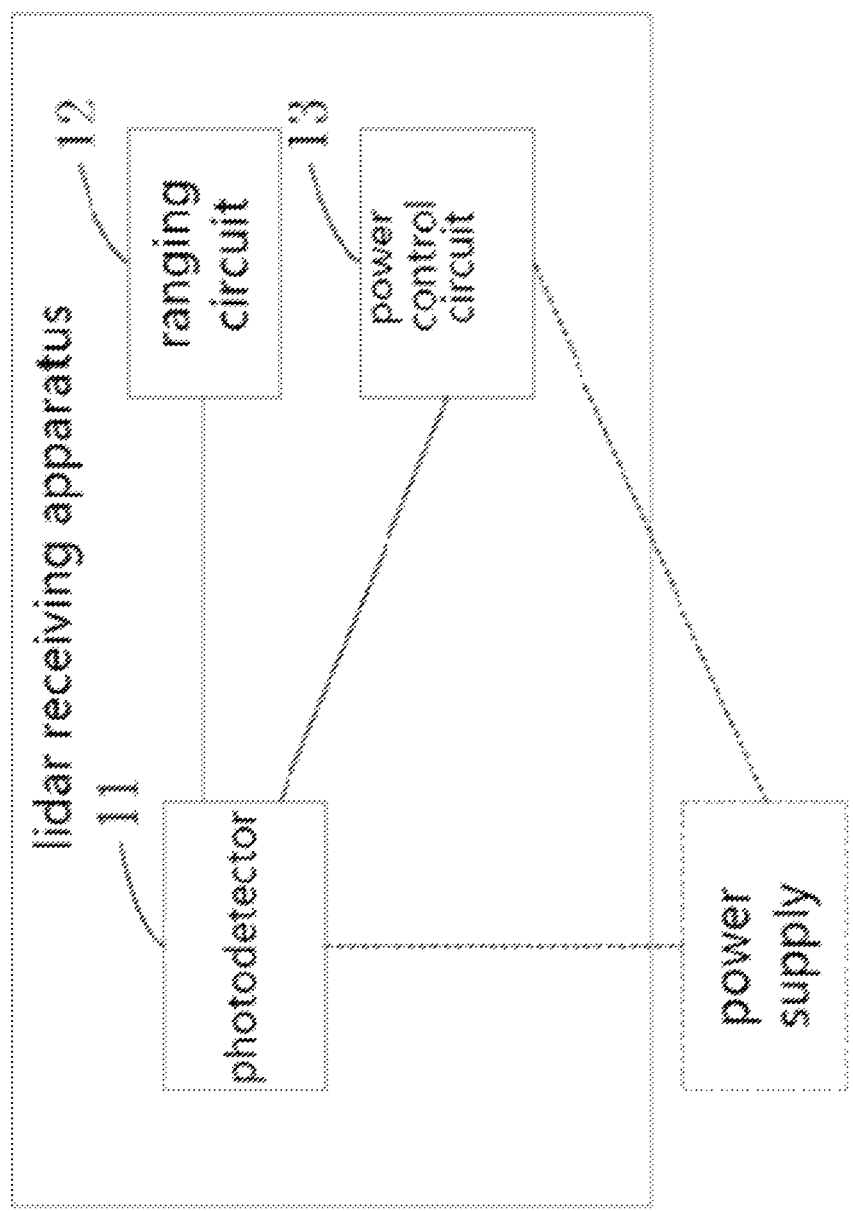
FIG. 2a is a block diagram showing a structure of a lidar receiving apparatus according to an embodiment.
Figure 2B:
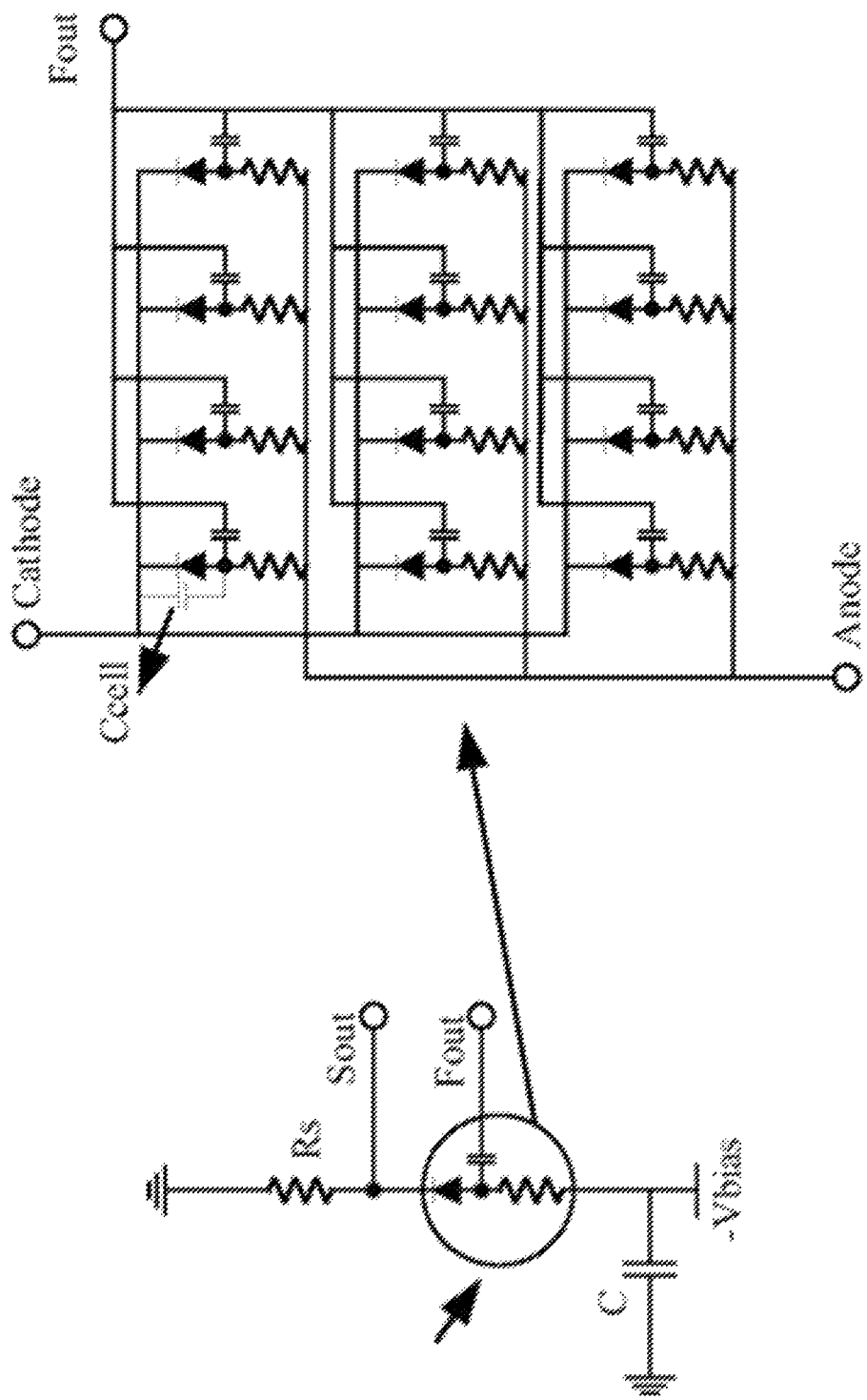
FIG. 2b is a schematic diagram showing a photodetector according to an embodiment.

In one embodiment, as shown in FIG. 2a, there is provided a lidar receiving apparatus, which is described by taking an application environment in FIG. 1 as an example. The lidar receiving apparatus may include:

a photodetector 11, which is configured to receive a reflected laser signal, and to convert the reflected laser signal into a current signal when a bias voltage of the photodetector is greater than a breakdown voltage of the same;

a ranging circuit 12, which is connected with the photodetector, and configured to calculate distance data according to the current signal;

a power control circuit 13, which is connected with the photodetector and configured to control the bias voltage applied to the photodetector according to a predefined rule;

wherein the predefined rule includes: at a receiving time of a stray reflected signal, the bias voltage of the photodetector is smaller than the breakdown voltage; and the receiving time of the stray reflected signal is a time at which the transmitted laser signal reaches the photodetector through a stray light path other than a ranging light path, and is correlated to a preset flight time of the stray reflected signal With reference to FIG. 2b, a high-sensitivity SiPM (silicon photomultiplier) serves as an example of photodetector. The SiPM is composed of a plurality of microcells connected in parallel, and each microcell is composed of an avalanche diode (APD) and a quenching resistor. When a bias voltage (generally, a reverse bias voltage, tens of volts) is applied to the SiPM, a depletion layer of the APD of each microcell has a high-intensity electric field. At this time, if there is a photon from the outside, Compton scattering occurs with electron-hole pairs in a semiconductor to eject electrons or holes. Then, the high-energy electrons and holes are accelerated in an electric field to eject a large number of secondary electrons and holes, that is, an avalanche effect occurs. At this time, a current output from each microcell suddenly increases, a voltage on the quenching resistor also increases, while the electric field in the APD decreases instantaneously, that is, an avalanche stops after the APD outputs a transient current pulse. Accordingly, an APD array may serve as a photodetector to convert a light signal into a current signal.

In particular, the SiPM has the following basic characteristics.

Figure 2C:
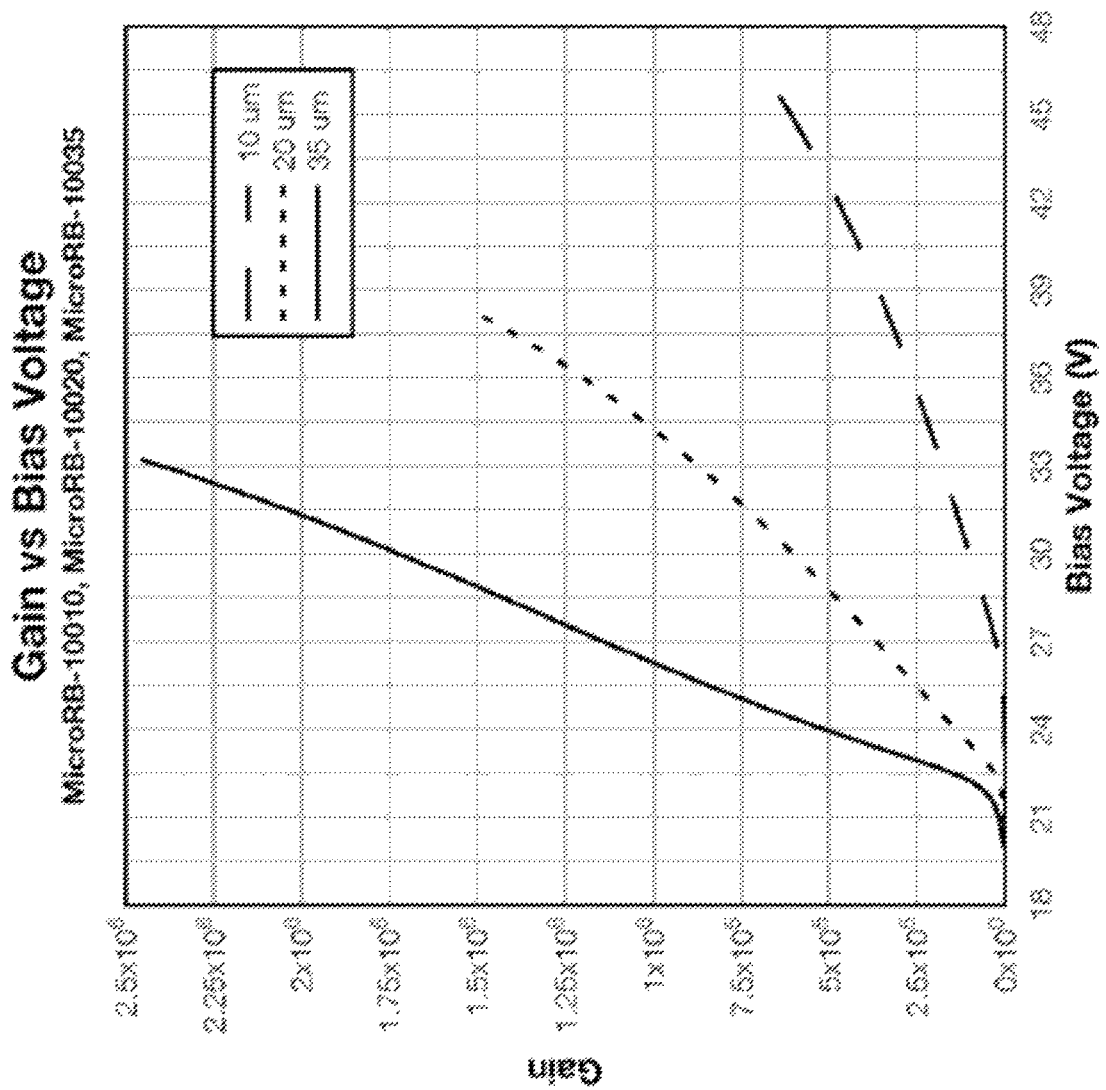
FIG. 2c is a curve showing a correspondence relationship between a gain and a bias voltage of a photodetector according to an embodiment.

A. A photoelectric amplification capability (that is, gain) of the SiPM is positively correlated to a bias voltage. FIG. 2c is a curve showing correspondence relationship between gains and bias voltages of SiPMs with different specifications. It may be seen that if a difference between the bias voltage and the breakdown voltage (a characteristic of the SiPM) is called an overvoltage, it may be found that the gain is in direct proportion to the overvoltage within a certain range. The smaller the overvoltage is, the smaller a photoelectric amplification factor is. When the overvoltage is close to or smaller than 0V, that is, when the bias voltage is smaller than the breakdown voltage, the gain is close to zero, that is, no avalanche effect occurs in the SiPM.

B. When there is an incident photon, the incident photon may be effectively absorbed by a large number of avalanche diodes and excites the avalanche effect, thereby making the large number of avalanche diodes conduct and output pulse currents. Thereafter, there is a need for charging equivalent capacitors $C_{cell}$ at two ends of each of the avalanche diodes (because each avalanche diode is connected in parallel with one equivalent capacitor due to the structure of the SiPM), such that charging the equivalent capacitors of the avalanche diodes is completed. Accordingly, the SiPM returns to a normal bias state. Before charging the equivalent capacitors is completed, the SiPM is difficult to effectively detect an incident light and output a current. Among them, the equivalent capacitor $C_{cell}$ and the quenching resistor R q determine a recovery time constant of the microcell, and a time it take to recover to 90% of a bias voltage is about 2.3 times the recovery time constant, that is, the recovery time may be:

$$T_{recovery}=2.3 \times R_q \times C_{cell}$$

In this embodiment, the lidar receiving apparatus may supply a power to the photodetector with an external power supply, that is, to apply a bias voltage. Accordingly, a power control circuit may control the external power supply to apply the bias voltage to the photodetector according to a predefined rule.

As shown in FIG. 2b, the photodetector includes a decoupling circuit and a readout circuit in addition to a photodetector such as a SiPM, wherein the decoupling circuit includes a decoupling capacitor C, which is located between a bias voltage applying end of the photodetector and ground (such as a casing) and configured to remove a power supply noise and stabilize the bias voltage; and the readout circuit includes a resistor R s, which is configured to convert a current signal into a voltage signal that is easy to measure. S out and $F_{out}$ are a direct-current coupling output terminal and an alternating-current coupling output terminal, respectively. In this embodiment, the output of the photodetector may be read out by employing the alternating-current coupling output terminal.

It should be noted that the receiving time of the stray reflected signal is a time at which the transmitted laser signal reaches the photodetector through a stray light path other than the ranging light path and is correlated to the preset flight time of the stray reflected signal, wherein the preset flight time of the stray reflected signal may be obtained by measuring a time it takes for the transmitted laser signal to reach the photodetector through the stray light path other than the ranging light path. Accordingly, the receiving time of the stray reflected signal may be a sum of the laser transmitting time and the preset flight time of the stray reflected signal, which is essentially a predicted receiving time of the stray reflected signal, because the actual receiving time of the stray reflected signal may not be detected during actual ranging.

Since the bias voltage of the photodetector is smaller than the breakdown voltage at the receiving time of the stray reflected signal, the stray reflected signal is unable to excite the photodetector, and there is no need for recovery time for the photodetector. Accordingly, when the reflected laser signal reaches the photodetector, the photodetector is in a normal working state, and the bias voltage is greater than the breakdown voltage. Therefore, the photodetector may generate a current signal corresponding to the reflected laser signal. Accordingly, the ranging circuit may calculate distance data according to the current signal.

Particularly, the ranging circuit may analyze the current signal corresponding to the reflected laser signal to obtain distance data, that is, a to-be-ranged distance, wherein the to-be-ranged distance is calculated according to the optical path length, as shown in the following formula:

$$D=0.15 m/ns \times T$$

wherein T is flight time of the reflected laser signal in ns (nanosecond).

It should be understood that the difference between the time at which the ranging circuit detects the current signal corresponding to the reflected laser signal and the laser transmitting time may serve as the flight time of the reflected laser signal, so that the to-be-ranged distance may be calculated according to the flight time of the reflected laser signal.

In the lidar receiving apparatus of this embodiment, at the receiving time of the stray reflected signal, the power control circuit may control the bias voltage of the photodetector so that it is smaller than the breakdown voltage, such that the stray reflected signal is unable to excite the photodetector, and there is no need for recovery time for the photodetector. Even if the flight time of the reflected laser signal is short during near ranging, the photodetector is in a normal working state and the bias voltage is greater than the breakdown voltage. The reflected laser signal may excite the photodetector, and the photodetector generates a current signal corresponding to the reflected laser signal. Therefore, the ranging circuit may calculate the distance data according to the current signal. The short-range blind area is decreased. It should be understood that the close-range blind area is theoretically an optical path length of the stray light path in the order of centimeters. However, on the entire system, the optical path length from a laser transmitted portion to the entire casing is considered, and non-blind detection area may be theoretically realized at a system level.

Figure 3:
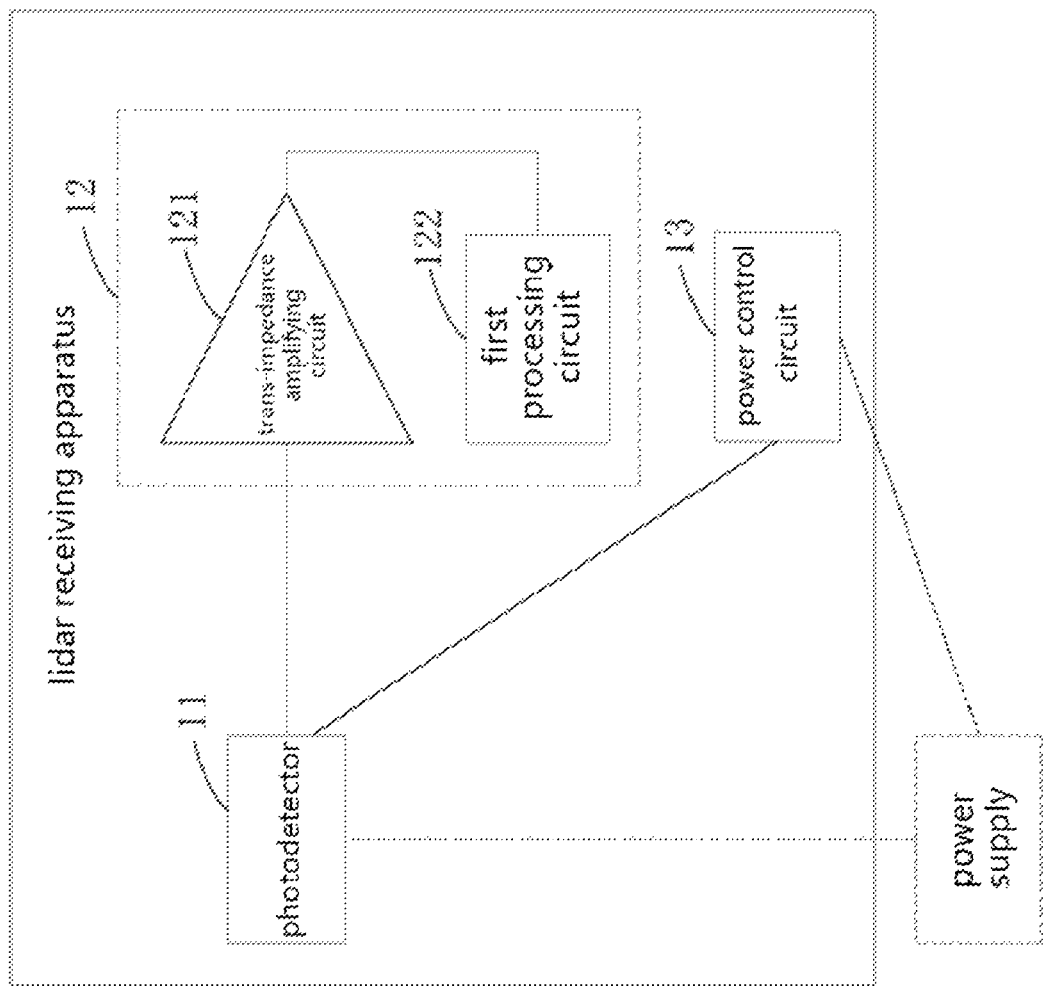
FIG. 3 is a block diagram showing a structure of a lidar receiving apparatus according to an embodiment.

In one embodiment, as shown in FIG. 3, there is provided with a structure of a ranging circuit. Particularly, the ranging circuit 12 may include:
- a trans-impedance amplifying circuit 121, which is connected with the photodetector 11, and configured to convert a current signal into a voltage signal and amplify the voltage signal to acquire an amplified voltage signal; and
- a first processing circuit 122, which is connected with the trans-impedance amplifying circuit 121, and configured to control a bias voltage applied to the photodetector 11 according to a predefined rule, and calculate distance data according to the amplified voltage signal.

It should be understood that a current signal generated by the photodetector according to the reflected laser signal is weak, and there is a need for converting the current signal into a voltage signal and amplifying the voltage signal by the trans-impedance amplifying circuit to be processed by the first processing circuit.

It should be noted that, in the absence of light, when the applied bias voltage is greater than the breakdown voltage, the SiPM will output a current signal, the current signal is positively correlated to the bias voltage and its duration is approximately the same as the recovery time of the microcell. For ease of differentiation, a current signal resulting from the reflected laser signal is called a photocurrent signal, and a corresponding voltage signal is called a photovoltage signal. A current signal resulting from the bias voltage (actually, an overvoltage) is called a bias current signal, and a corresponding voltage signal is called a bias voltage signal. Therefore, the voltage signal obtained by the first processing circuit may only include the bias voltage signal at most times; and at a time at which the reflected laser signal reaches the photodetector, the voltage signal includes the bias voltage signal and the photovoltage signal.

It may be seen that when the reflected laser signal reaches the photodetector, the voltage signal received by the first processing circuit will suddenly increase. Therefore, for example, the first processing circuit may calculate a voltage gradient of the voltage signal according to the received voltage signal. When the voltage gradient of the voltage signal is greater than a preset gradient threshold, it is determined that the voltage signal at this time includes a photovoltage signal, that is, this time is a time at which the reflected laser signal reaches the photodetector, so that the flight time of the reflected laser signal may be calculated according to the time at which the reflected laser signal reaches the detection photoelectric signal and the laser transmitting time, and further the to-be-ranged distance is calculated.

In some embodiments, the first processing circuit may detect the photovoltage signal by employing other signal processing methods, so as to determine the time at which the reflected laser signal reaches the photodetector, which is not limited in this embodiment.

However, in general, a photocurrent signal is weaker than a bias current signal, and there might even be a difference of an order of magnitude between the intensity of the photocurrent signal and that of the bias current signal. As such, it is difficult for the ranging circuit to detect the photocurrent signal or the photovoltage signal. Accordingly, with reference to FIG. 4, based on the lidar receiving apparatus shown in FIG. 2a, the lidar receiving apparatus of this embodiment may further include a reference photodetector 14, wherein the reference photodetector 14 is in a light-shielded state, and is connected in parallel with the photodetector 11;

the ranging circuit 12 may include:
- a cancelling and trans-impedance amplifying circuit 123, which is connected with the photodetector 11 and the reference photodetector 14, respectively, and configured to perform cancellation and trans-impedance amplification on both current signals output from the photodetector 11 and the reference photodetector 14 and output voltage signals obtained after the cancellation and the trans-impedance amplification are performed, wherein the current signal output from the reference photodetector 14 is positively correlated to the bias voltage applied to the reference photodetector 14; and
- a second processing circuit 124, which is connected with the cancelling and trans-impedance amplifying circuit 123, and configured to control the bias voltage applied to the photodetector 11 according to the predefined rule, and calculate the distance data according to the voltage signals obtained after the cancellation and the trans-impedance amplification are performed.

It should be understood that, because the reference photodetector is connected in parallel with the photodetector, the bias voltage of the reference photodetector is equal to that of the photodetector, that is, the bias current signals of the reference photodetector and the photodetector are the same. Meanwhile, because the reference photodetector is in the light-shielded state, the current signal output from the reference photodetector is a bias current signal at any time. Therefore, the voltage signal obtained after the cancellation and the trans-impedance amplification are performed has been cancelled, and a bias voltage signal component thereof is removed, only leaving the photovoltage signal component. Therefore, the voltage signal obtained after the cancellation and the trans-impedance amplification are performed is a photovoltage signal at the time at which the reflected laser signal reaches the photodetector, and should be 0 other than the time at which the reflected laser signal reaches the detection photoelectric signal. Therefore, the second processing circuit may sensitively detect the voltage signal obtained after the cancellation and the trans-impedance amplification are performed, and the time of detecting the voltage signal obtained after the cancellation and the trans-impedance amplification are performed serves as the time at which the reflected laser signal reaches the photodetector. Accordingly, the sensitivity and the accuracy of detecting the reflected laser signal are improved, and the ranging accuracy is increased.

In one embodiment, the cancelling and trans-impedance amplifying circuit 123 may include:
- a first cancelling circuit, which is connected with the photodetector and the reference photodetector, respectively, and configured to cancel both current signals output from the photodetector and the reference photodetector and output cancelled current signals;
- a first trans-impedance amplifying circuit, which is connected with the first cancelling circuit, and configured to convert the cancelled current signals into voltage signals and amplify the voltage signals to acquire amplified voltage signals.

In another embodiment, the cancelling and trans-impedance amplifying circuit may include:
- a second trans-impedance amplifying circuit, which is connected with the photodetector and the reference photodetector, respectively, and configured to convert both current signals output from the photodetector and the reference photodetector into voltage signals, respectively, and amplify the voltage signals to acquire two amplified voltage signals; and a second cancelling circuit, which is connected with the second trans-impedance amplifying circuit, and configured to cancel the two amplified voltage signals and output cancelled voltage signals.

It should be noted that there are at least two ways to implement the cancelling and trans-impedance amplifying circuit: one is to firstly perform current subtraction and then perform trans-impedance amplification, that is, the first embodiment described above; the other is to firstly perform trans-impedance amplification and then perform voltage subtraction, that is, the second embodiment described above. Since the second embodiment will limit an effective dynamic range of a signal link and increase the power consumption and the cost, the present application implements the cancelling and trans-impedance amplifying circuit by employing the first embodiment, wherein the first cancelling circuit may be a balun transformer, and the first trans-impedance amplifying circuit may be a trans-impedance amplifier.

Figure 5A:
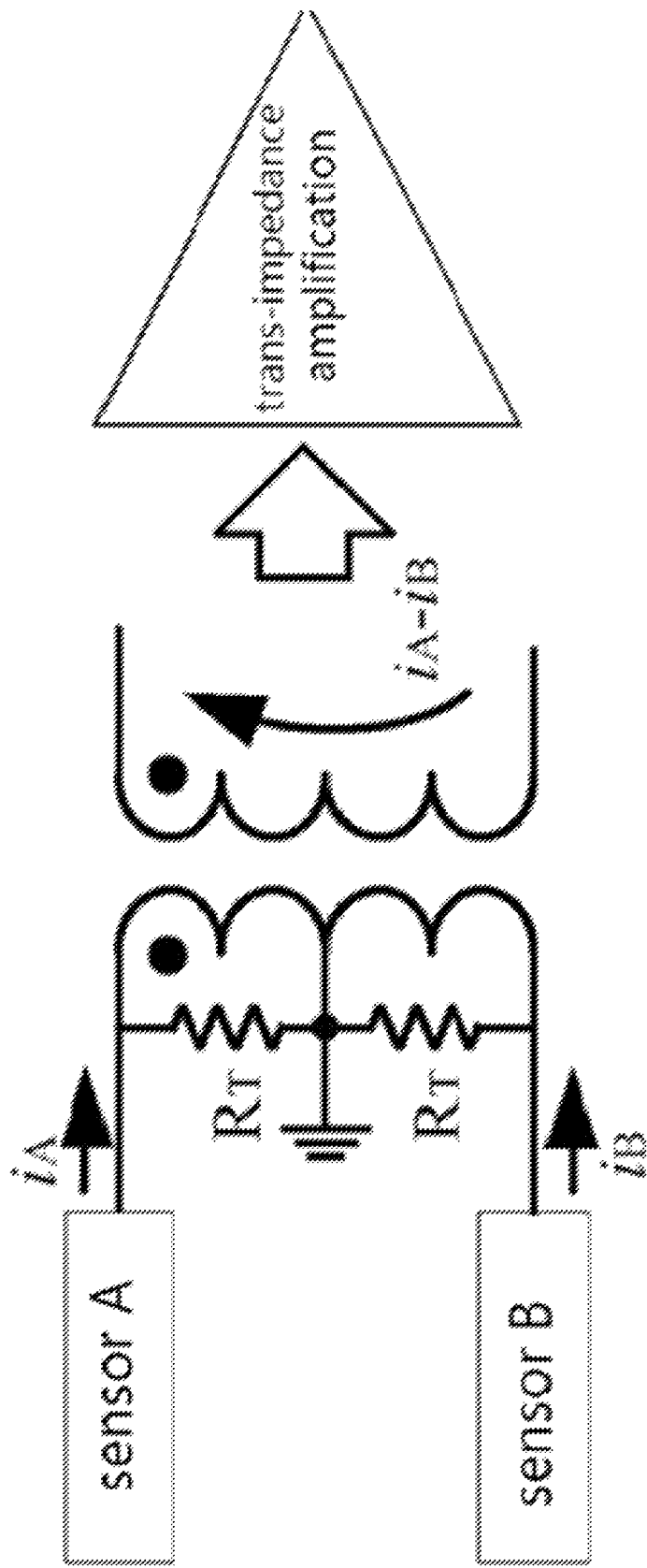
FIG. 5a is a first schematic diagram showing a cancelling and trans-impedance amplifying circuit according to an embodiment.

FIG. 5a shows an embodiment of a cancelling and trans-impedance amplifying circuit. Current signals output from sensor A (a photodetector) and sensor B (a reference photodetector) are input to both ends of a balancing side of the balun transformer, respectively. A current remained after cancellation is performed is coupled to a primary side through a transformer. Then the current signals are input to the trans-impedance amplifier for trans-impedance amplification to acquire voltage signals subjected to trans-impedance amplification. Particularly, in this embodiment, a balun transformer with low insertion loss and high symmetry may be selected, that is, a balun transformer with small signal attenuation and good cancellation performance. Therefore, a photocurrent signal range close to the output of a single photodetector may be obtained. In terms of the noise, a thermal noise of a matching resistor RT is mainly added, and is much smaller than a current noise of the trans-impedance amplifying circuit itself (the noise exists in a trans-impedance amplification process). The influence of the noise on a signal-to-noise ratio of the photocurrent signal may be basically ignored. That is, only the extremely small thermal noise is added. However, the photocurrent signal is hardly weakened, and the influence on the signal-to-noise ratio is small. Therefore, the photocurrent signal amplification capability of the circuit is hardly reduced.

Figure 5B:
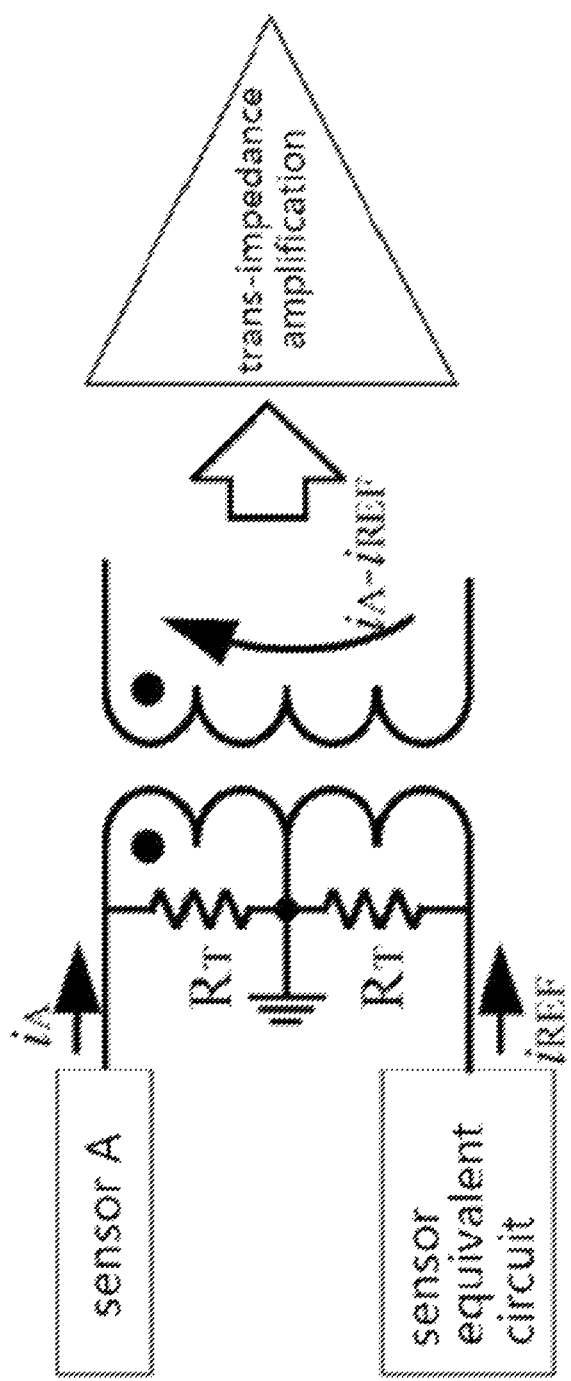
FIG. 5b is a second schematic diagram showing a cancelling and trans-impedance amplifying circuit according to an embodiment.

FIG. 5b shows an embodiment of a cancelling and trans-impedance amplifying circuit. A structure of the cancelling and trans-impedance amplifying circuit is basically the same as that shown in FIG. 5b, but only one sensor A is used. A cancellation signal output from the reference photodetector is realized by a passive circuit (a sensor equivalent circuit). The sensor equivalent circuit may achieve an output characteristic equivalent to the reference photodetector in a light-shielded state under a bias voltage controlled by the power control circuit.

Figure 5C:
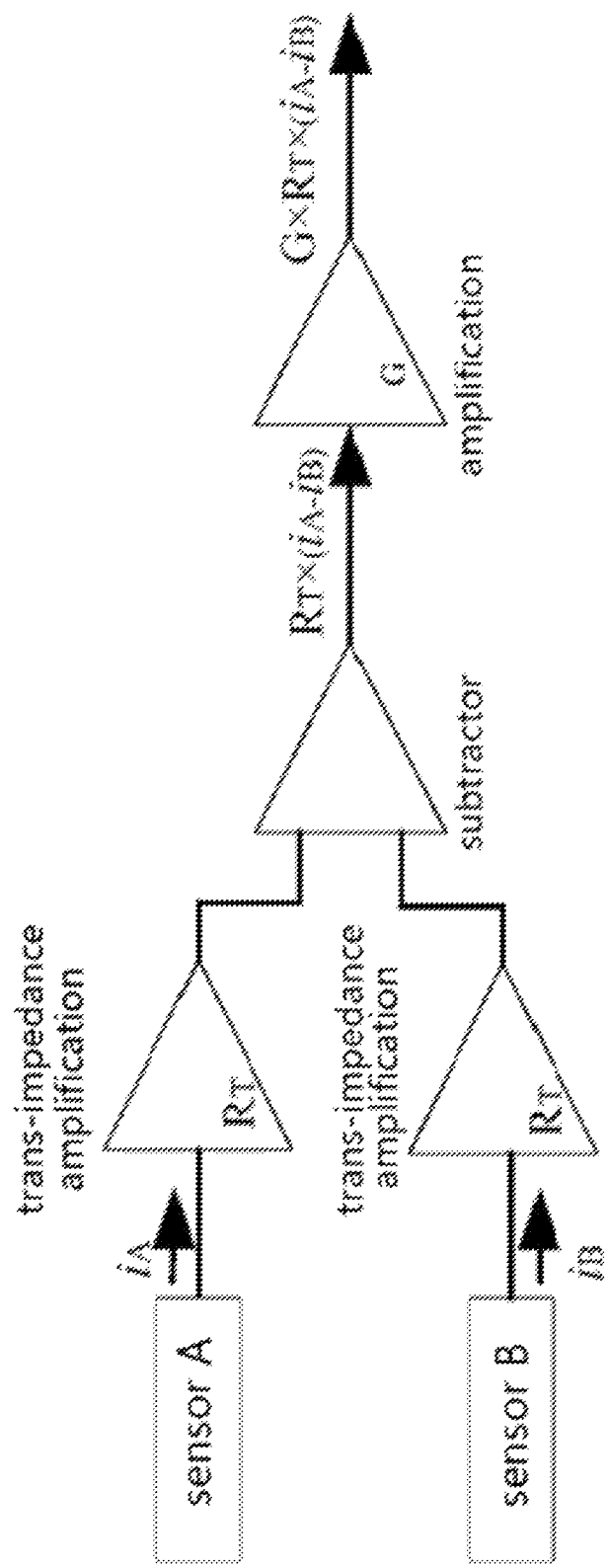
FIG. 5c is a third schematic diagram showing a cancelling and trans-impedance amplifying circuit according to an embodiment.

FIG. 5c shows an embodiment of a cancelling and trans-impedance amplifying circuit. Current signals output from sensor A (a photodetector) and sensor B (a reference photodetector) are respectively input to a trans-impedance amplifier for primary amplification. The trans-impedance amplifier outputs amplified voltage signals. The two amplified voltage signals are input to a subtractor, which outputs the canceled voltage signals. Then, secondary amplification is performed on the canceled voltage signals.

Figure 5D:
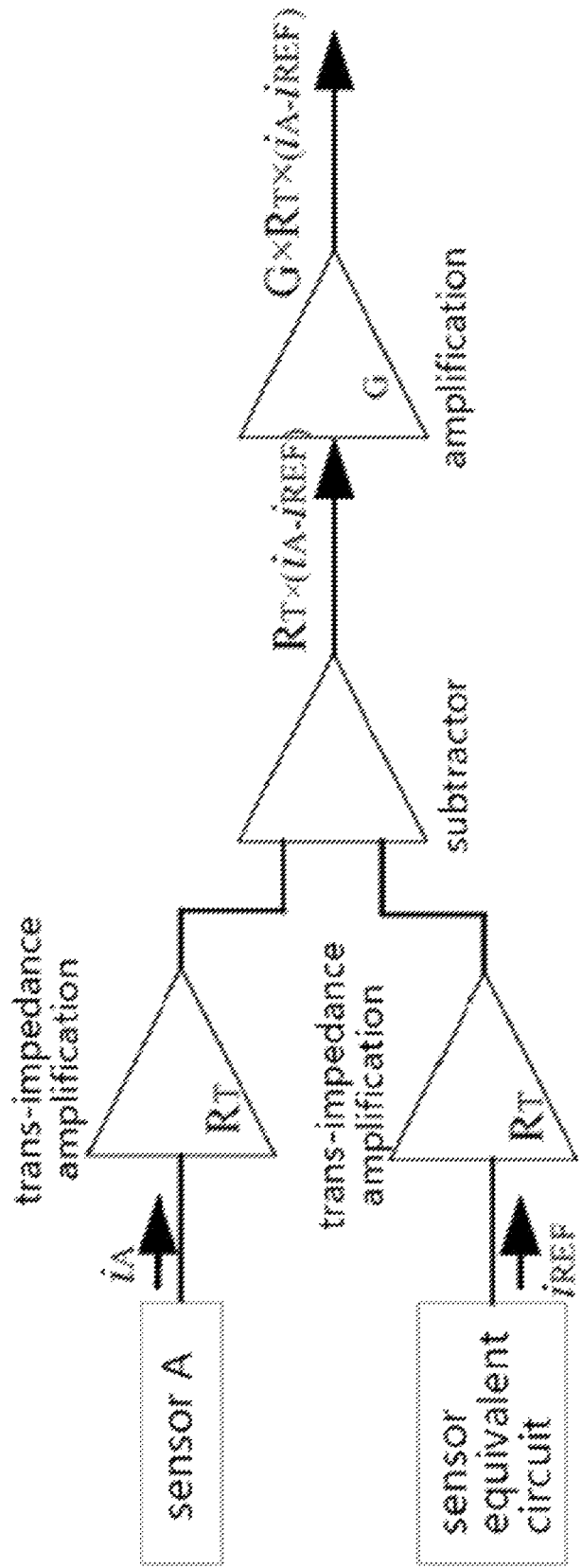
FIG. 5d is a fourth schematic diagram showing a cancelling and trans-impedance amplifying circuit according to an embodiment.

FIG. 5d shows an embodiment of a cancelling and trans-impedance amplifying circuit. A structure of the cancelling and trans-impedance amplifying circuit is basically the same as that shown in FIG. 5c, but only one sensor A is used. A cancellation signal output from the reference photodetector is implemented by a passive circuit (a sensor equivalent circuit) as well.

For the comparison of the four cancelling and trans-impedance amplifying circuits described above, there is a need for the obvious problem in the latter two solutions to use two trans-impedance amplifiers. Moreover, after the primary trans-impedance amplification is performed, in order to limit amplitude unsaturation of a primary output signal, the trans-impedance gain will be reduced, and there is a need for additionally increasing an amplification stage, which not only increases the power consumption, but also increases the cost. For the first circuit, the design requirements may be met. However, the cost is increased because the two sensors are used. For the second circuit, better advantages in cost and power consumption are obtained since only one sensor is used.

Figure 4:
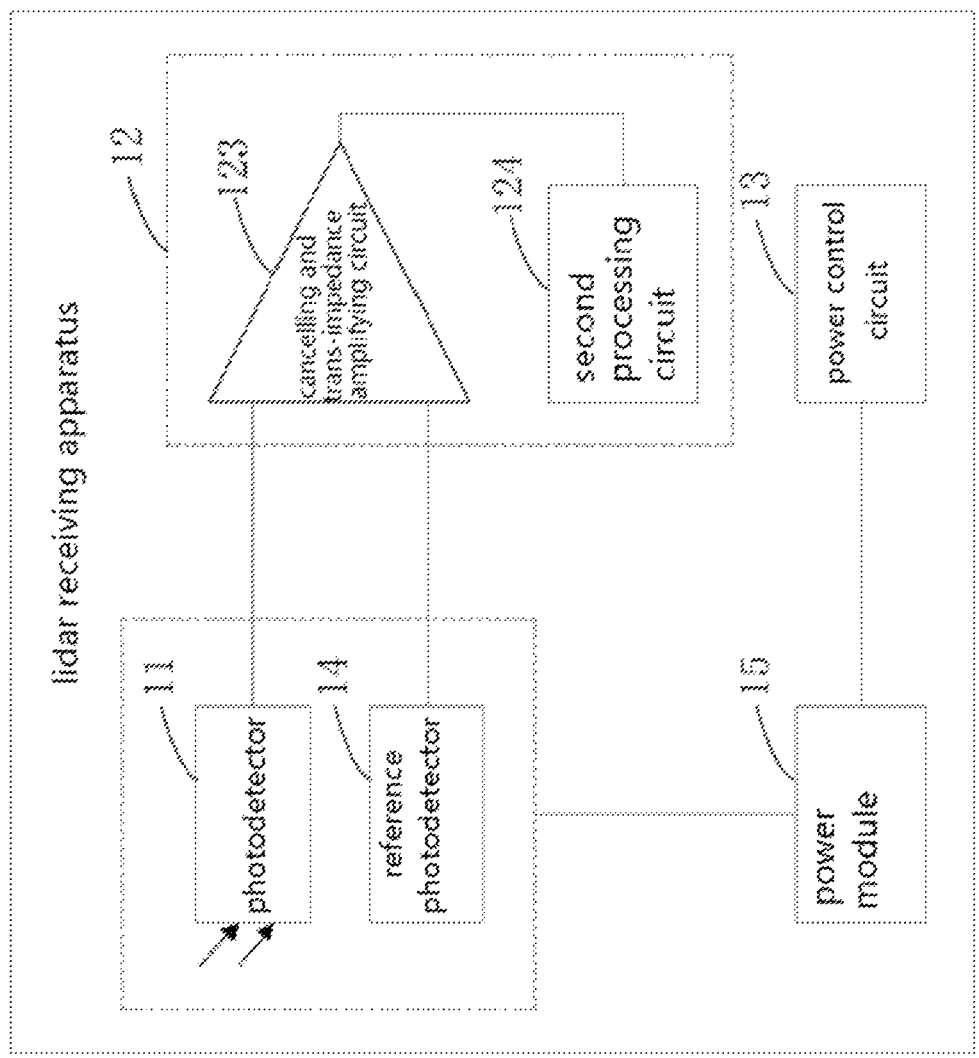
FIG. 4 is a block diagram showing a structure of a lidar receiving apparatus according to an embodiment.

With reference to FIG. 4, the lidar receiving apparatus may further include:

a power module 15, which is connected with the photodetector 11 and the power control circuit 13, respectively, and configured to receive a control signal transmitted from the power control circuit 13 and apply a bias voltage corresponding to the control signal to the photodetector 11. It should be understood that when the reference photodetector is connected in parallel with the photodetector, the power module applies the bias voltage to the reference photodetector while applying the same bias voltage to the photodetector. The power module is integrated in a lidar receiving apparatus, which may make the lidar receiving apparatus more compact and the way of supplying power more convenient.

Figure 6:
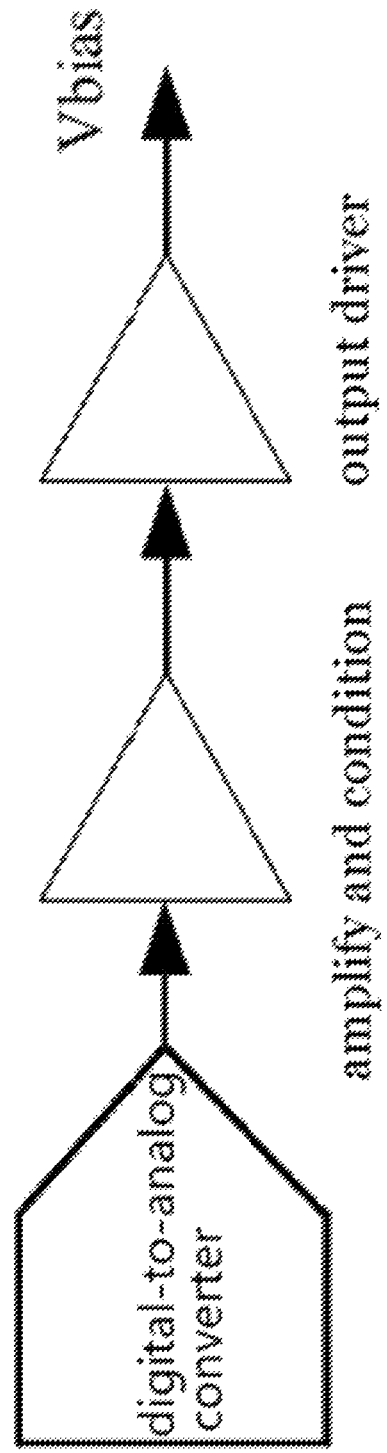
FIG. 6 is a schematic diagram showing a power module according to an embodiment.

As shown in FIG. 6, the power module may include a digital-to-analog converter, an amplifying and conditioning device and an output driver which are connected in sequence. The digital-to-analog converter is configured to receive a digital control signal transmitted by a power control circuit and to convert the digital control signal into an analog control signal, wherein the analog control signal is a voltage control signal, for example, a voltage waveform signal of 0 to 1V. The amplifying and conditioning device is configured to amplify and condition the voltage control signal (such as an up and down movement of the voltage control signal to adjust an amplitude range). The output driver may be a power amplifier, which may amplify the amplified and conditioned voltage control signal and output it to the photodetector, that is, to output a bias voltage. The power module may achieve precise control of the bias voltage in time and amplitude by matching the high-speed digital-to-analog converter with the output driver with a high driving capability.

Figure 7:
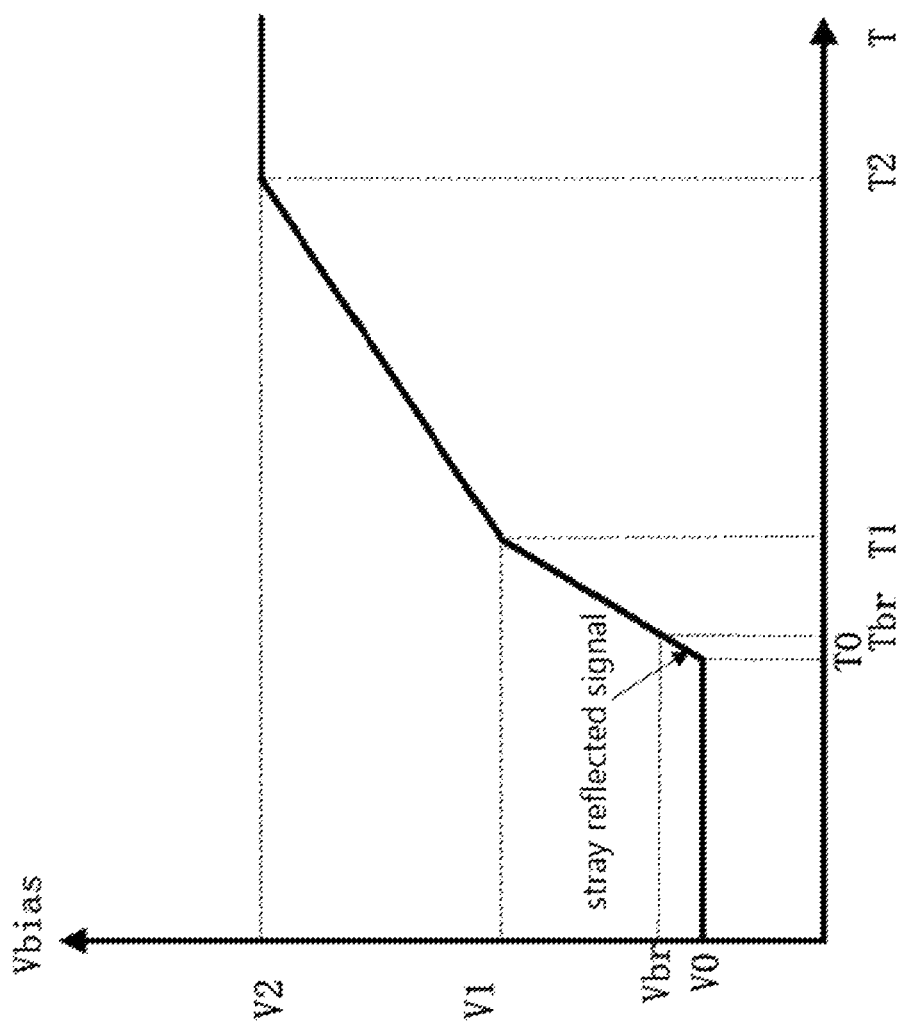
FIG. 7 is a schematic diagram showing a waveform of a bias voltage of a photodetector according to an embodiment.

In one embodiment, FIG. 7 shows a schematic diagram showing a waveform for detecting a bias voltage of a photodetector and represents a predefined rule for controlling the bias voltage by a power control circuit. Particularly, the predefined rule may include: the power control circuit controls the bias voltage applied to the photodetector so that it is smaller than a breakdown voltage of the same within a first preset time period between a transmitting time and an initial time, wherein the transmitting time is a transmitting time of a transmitted laser signal, the initial time is after the receiving time of the stray reflected signal, and the first preset time period is a time period including the receiving time of the stray reflected signal.

In some embodiments, the power control circuit is further configured to boost the bias voltage applied to the photodetector within a second preset time period between the initial time and a first time, with a boosting gradient greater than a preset gradient, and the second preset time period is a boosting time period of the bias voltage.

In some embodiments, the ranging circuit is further configured to: in a third preset time period between the first time and a second time, determine a value of a bias voltage corresponding to a current time according to a preset correspondence relationship between a receiving time of the reflected laser signal and the bias voltage, and control the bias voltage applied to the photodetector according to the value of the bias voltage corresponding to the current time, wherein the preset correspondence relationship between the receiving time of the reflected laser signal and the bias voltage is determined according to a preset correspondence relationship between a ranging flight time and a gain of the photodetector and a preset correspondence relationship between a gain of the photodetector and the bias voltage, and the third preset time period is a ranging time period.

With reference to FIG. 7, the laser transmitting time may be a T=0 time, the initial time is $T_{br}$, and the initial time is after the receiving time of the stray reflected signal. so as to be within the first preset time period from 0 to $T_{br}$, the bias voltage is smaller than the breakdown voltage $V_{br}$, and the photoelectric amplification gain is approximately zero. Accordingly, a stray reflected signal is prevented from exciting the photodetector.

During the second preset time period from $T_{br}$ to $T_1$, the bias voltage boosts rapidly, and the boosting gradient is higher than 1V/ns, so that a photoelectric amplification factor of the photodetector is rapidly increased to ensure that the photodetector may sufficiently effectively amplify a real reflected laser signal after the stray reflected signal within the third preset time period, so as to be detected. In order to boost the bias voltage as soon as possible, the bias voltage at the $T_{br}$ time may be $V_{br}$. The duration of the second preset time period may be reduced.

During the third preset time period from $T_1$ to $T_3$, the lidar receiving apparatus may sufficiently and effectively amplify the reflected laser signal. During near ranging, the reflected laser signal has a short flight time and high intensity, so that the requirement for the gain is low and the reflected laser signal is prevented from being oversaturated. During remote ranging, the reflected laser signal has a long flight time and low intensity; therefore, a high gain is required so as to refrain from failing to detect the reflected laser signal. Therefore, the correspondence relationship between the flight time of the reflected laser signal and the bias voltage may be determined according to the preset correspondence relationship between a ranging flight time and the gain of the photodetector and the preset correspondence relationship between a gain of the photodetector and the bias voltage. Further, the correspondence relationship between the receiving time of the reflected laser signal and the bias voltage may be determined according to the laser transmitting time.

The preset correspondence relationship between the ranging flight time and the gain of the photodetector may be determined according to the gains required by reflected laser signal intensities corresponding to different ranging flight times. The preset correspondence relationship between the gain of the photodetector and the bias voltage may be determined according to the gain of the photodetector under measured different bias voltages.

It should be understood that the first preset time period is determined with respect to the laser transmitting time and the initial time. The initial time is related to the receiving time of the stray reflected signal. If the receiving time of the stray reflected signal is high enough in accuracy and is high enough in confidence, the initial time may be equal to the receiving time of the stray reflected signal. Generally, there is a need for setting a safety time period between the receiving time of the stray reflected signal and the initial time. The second preset time period is related to the initial time and the first time, and is actually related to the boosting capability of the power module to the bias voltage. The faster the boosting gradient is, the shorter the second preset time period is. In a case of a certain boosting capability of the bias voltage, the first time is correlated to the shortest effective ranging distance. When the shortest effective ranging distance is measured, the reflected laser signal may be effectively amplified, so that the current signal corresponding to the reflected laser signal may be detected. The third preset time period is correlated to the first time and the second time, and the second time is correlated to the longest effective ranging distance. When the to-be-ranged distance is longer, the reflected laser signal intensity is extremely low, and thus a greater gain, a more sensitive photodetector and a more accurate signal processing algorithm are required.

A bias voltage control rule of this embodiment suppresses the stray reflected signal of the stray light path on the one hand, and implements time gain control on the other hand. An amplification factor of the photodetector is limited by changing the bias voltage at different times, so that the reflected laser signal is prevented from being saturated and the ranging accuracy is ensured.

In one embodiment, when the transmitted laser signal is a pulse signal, the power control circuit is configured to output a control signal according to a predefined rule, and control the application of a pulse bias voltage to the photodetector through the control signal. Certainly, this embodiment is not limited to a continuous laser signal or a pulsed laser signal. The pulsed laser signal is relatively high in power, so that the longest effective ranging distance may be increased and the ranging range may be increased. It should be understood that the pulse signal has a certain period. In each period, the control of the power control circuit of this embodiment on the bias voltage may refer to the above description.

In one embodiment, the preset flight time of the stray reflected signal is a statistical value of multiple measured values of the flight time in the process in which the transmitted laser signal reaches the photodetector through the stray light path other than the ranging light path. In some embodiments, the statistical value of the multiple measurement values of the flight time may be the maximum value of the multiple measurement values, because the bias voltage is generally controlled to be smaller than the breakdown voltage before the predicted receiving time of the stray reflected signal, so that it is possible to make the predicted receiving time of the stray reflected signal as large as possible within a certain confidence range, and ensure the real receiving time of the stray reflected signal is before the predicted receiving time of the stray reflected signal as much as possible, so as to ensure that the bias voltage at the real receiving time of the stray reflected signal is smaller than the breakdown voltage and improve the stability.

In addition, this embodiment further provides a lidar system, which includes a lidar transmitting apparatus configured to transmit a laser signal, and the above-mentioned lidar receiving apparatus. Theoretically, the lidar system of this embodiment may realize a non-blind detection area.

Figure 8:
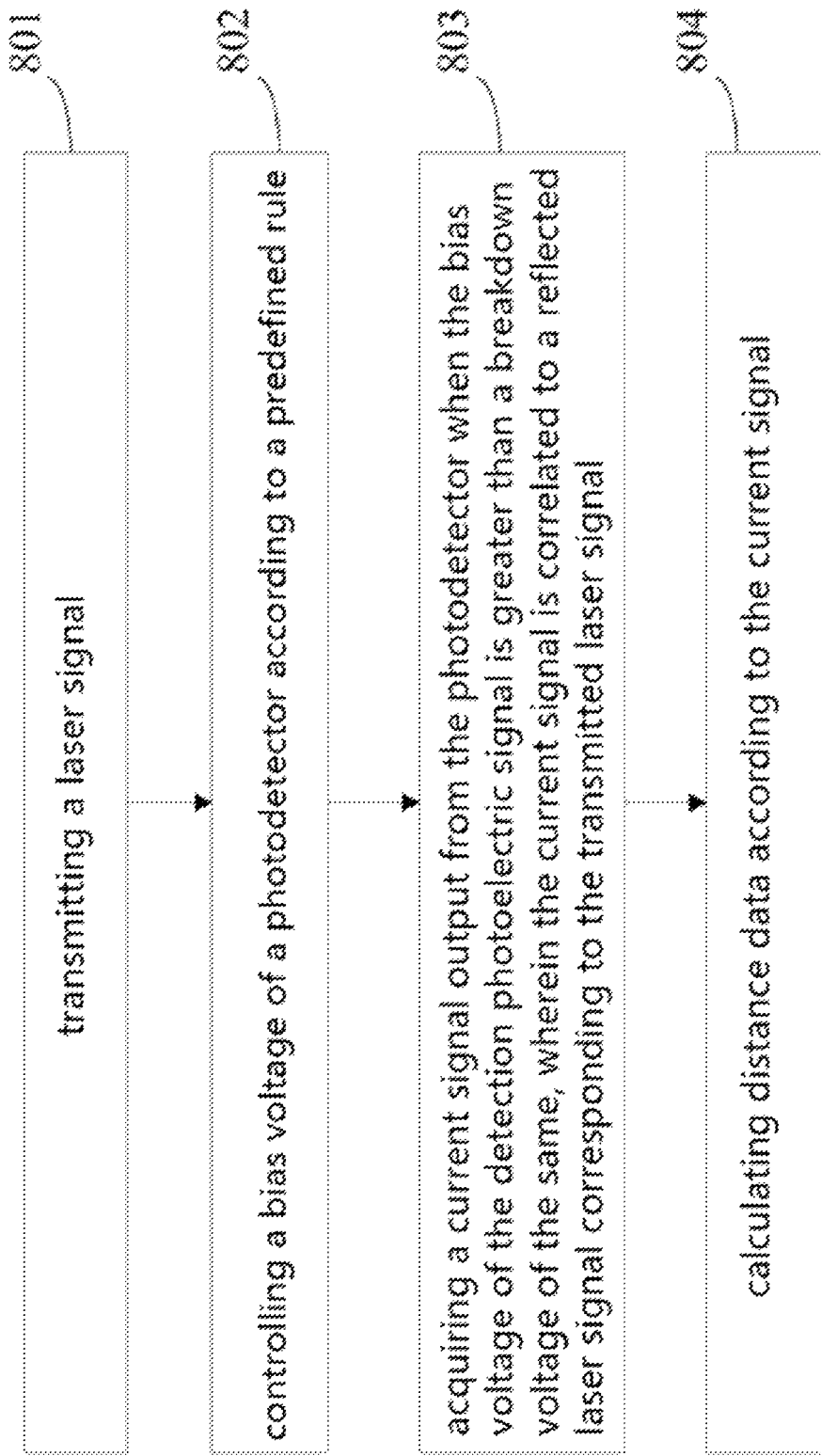
FIG. 8 is a schematic flow diagram of a laser ranging method according to an embodiment.

With reference to FIG. 8, this embodiment further provides a laser ranging method, which may include:

S801: transmitting a laser signal;
S802: controlling a bias voltage of a photodetector according to a predefined rule;
S803: acquiring a current signal output from the photodetector when the bias voltage of the photodetector is greater than a breakdown voltage of the same, wherein the current signal is correlated to a reflected laser signal corresponding to the transmitted laser signal; and
S804: calculating distance data according to the current signal,
wherein the predefined rule includes: at a receiving time of a stray reflected signal, the bias voltage of the photodetector is smaller than the breakdown voltage; and the receiving time of the stray reflected signal is a time at which the transmitted laser signal reaches the photodetector through a stray light path other than a ranging light path, and is correlated to a preset flight time of the stray reflected signal.

The laser ranging method of this embodiment may be applied in a lidar system. At the receiving time of the stray reflected signal, a controller of the lidar system may control the bias voltage of the photodetector so that it is smaller than the breakdown voltage, and the stray reflected signal is unable to excite the photodetector, and there is no need for recovery time for the photodetector. Even if the flight time of the reflected laser signal is short during near ranging, the photodetector is in a normal working state and the bias voltage is greater than the breakdown voltage, as such, the reflected laser signal may excite the photodetector, and the photodetector generates a current signal corresponding to the reflected laser signal. The reflected laser signal after the stray reflected signal may be effectively detected. Therefore, the controller of the lidar system may calculate the distance data according to the current signal. A short-range blind area is decreased.

In one embodiment, S804 may include: converting the current signal into a voltage signal and amplifying the voltage signal to acquire an amplified voltage signal; and calculating distance data according to the amplified voltage signal.

In another embodiment, the method may further include: acquiring a current signal output from a reference photodetector while acquiring a current signal output from the photodetector, wherein the reference photodetector is in a light-shielded state and is associated with the photodetector, and the current signal output from the reference photodetector is positively correlated to the bias voltage of the reference photodetector. S804 may include: performing cancellation and trans-impedance amplification on both current signals output from the photodetector and the reference photodetector, and outputting voltage signals obtained after the cancellation and the trans-impedance amplification are performed; and calculating distance data according to the voltage signals obtained after the cancellation and the trans-impedance amplification are performed.

For a specific description of the laser ranging method, reference is made to the foregoing description of the lidar receiving apparatus, and details will be omitted here.

In one embodiment, a laser ranging controller includes a memory and a processor. The memory stores a computer program, and the processor implements the following steps when executing the computer program:

transmitting a laser signal;
controlling a bias voltage of a photodetector according to a predefined rule;
acquiring a current signal output from the photodetector when the bias voltage of the photodetector is greater than a breakdown voltage of the same, wherein the current signal is correlated to a reflected laser signal corresponding to the transmitted laser signal; and
calculating distance data according to the current signal, wherein the predefined rule includes: at a receiving time of the stray reflected signal, the bias voltage of the photodetector is smaller than the breakdown voltage; and the receiving time of the stray reflected signal is a time at which the transmitted laser signal reaches the photodetector through a stray light path other than a ranging light path, and is correlated to a preset flight time of the stray reflected signal.

In one embodiment, a computer readable storage medium stores a computer program thereon, wherein the computer program implements the following steps when being executed by a processor:

transmitting a laser signal;
controlling a bias voltage of a photodetector according to a predefined rule;
acquiring a current signal output from the photodetector when the bias voltage of the photodetector is greater than a breakdown voltage of the same, wherein the current signal is correlated to a reflected laser signal corresponding to the transmitted laser signal; and
calculating distance data according to the current signal, wherein the predefined rule includes: the bias voltage of the photodetector is smaller than the breakdown voltage at a receiving time of the stray reflected signal; and the receiving time of the stray reflected signal is a time at which the transmitted laser signal reaches the photodetector through a stray light path other than a ranging light path, and is correlated to a preset flight time of the stray reflected signal.

The technical features of the above embodiments may be arbitrarily combined. In order to make the description concise, all possible combinations of the technical features in the above embodiments have not been described. However, if there is no contradiction in the combinations of these technical features, these combinations should be considered to be the range described in this specification.

Although description of some implementations of the present application is presented in the embodiments above, the description should not be understood as limiting the protection scope of the present application. It should be noted that, various modifications and improvements may be made by those skilled in the art without departure from the concept of the present application, and would fall within the protective scope of the present application. As such, the protection scope of the present application should be limited only by the appended claims.

The invention claimed is:

1. A lidar receiving apparatus, comprising:
a photodetector, which is configured to receive a reflected laser signal and to convert the reflected laser signal into a current signal when a bias voltage of the photodetector is greater than a breakdown voltage of the same;
a ranging circuit, which is connected with the photodetector, and configured to calculate distance data according to the current signal, wherein the distance data is calculated according to a flight time of the reflected laser signal;

a power control circuit, which is connected with the photodetector, and configured to control the bias voltage applied to the photodetector according to a predefined rule, wherein the predefined rule comprises: at a receiving time of a stray reflected signal, the bias voltage of the photodetector is smaller than the breakdown voltage; and the receiving time of the stray reflected signal is a time at which a transmitted laser signal reaches the photodetector through a stray light path other than a ranging light path, and is correlated to a preset flight time of the stray reflected signal; and a reference photodetector, wherein the reference photodetector is connected in parallel with the photodetector;

wherein the ranging circuit comprises:
 a cancelling and trans-impedance amplifying circuit, which is connected with the photodetector and the reference photodetector, respectively, and configured to perform cancellation and trans-impedance amplification on both current signals output from the photodetector and the reference photodetector, and output voltage signals obtained after the cancellation and the trans-impedance amplification are performed; and
 a second processing circuit, which is connected with the cancelling and trans-impedance amplifying circuit, and configured to calculate the distance data according to the voltage signals obtained after the cancellation and the trans-impedance amplification are performed.

2. The lidar receiving apparatus according to claim 1, wherein the ranging circuit comprises:
 a trans-impedance amplifying circuit, which is connected with the photodetector, and configured to convert the current signal into a voltage signal and amplify the voltage signal to acquire an amplified voltage signal; and
 a first processing circuit, which is connected with the trans-impedance amplifying circuit, and configured to calculate distance data according to the amplified voltage signal.

3. The lidar receiving apparatus according to claim 1, wherein the cancelling and trans-impedance amplifying circuit comprises:
 a first cancelling circuit, which is connected with the photodetector and the reference photodetector, respectively, and configured to cancel both current signals output from the photodetector and the reference photodetector and output cancelled current signals; and
 a first trans-impedance amplifying circuit, which is connected with the first cancelling circuit, and configured to convert the cancelled current signals into voltage signals and amplify the voltage signals to acquire amplified voltage signals.

4. The lidar receiving apparatus according to claim 1, wherein the cancelling and trans-impedance amplifying circuit comprises:
 a second trans-impedance amplifying circuit, which is connected with the photodetector and the reference photodetector, respectively, and configured to convert both current signals output from the photodetector and the reference photodetector into voltage signals, respectively, and amplify the voltage signals to acquire two amplified voltage signals; and
 a second cancelling circuit, which is connected with the second trans-impedance amplifying circuit, and configured to cancel the two amplified voltage signals and output cancelled voltage signals.

5. The lidar receiving apparatus according to claim 1, wherein the power control circuit is configured to control the bias voltage applied to the photodetector so that it is smaller than the breakdown voltage within a first preset time period between a transmitting time and an initial time, wherein the transmitting time is a transmitting time of a transmitted laser signal, the initial time is after the receiving time of the stray reflected signal, and the first preset time period is a time period including the receiving time of the stray reflected signal.

6. The lidar receiving apparatus according to claim 5, wherein the power control circuit is further configured to boost the bias voltage applied to the photodetector within a second preset time period between the initial time and a first time, with a boosting gradient greater than a preset gradient, and the second preset time period is a boosting time period of the bias voltage.

7. The lidar receiving apparatus according to claim 6, wherein the power control circuit is further configured to: in a third preset time period between the first time and a second time, determine a value of the bias voltage corresponding to a current time according to a preset correspondence relationship between a receiving time of the reflected laser signal and the bias voltage, and control the bias voltage applied to the photodetector according to the value of the bias voltage corresponding to the current time, wherein the preset correspondence relationship between the receiving time of the reflected laser signal and the bias voltage is determined according to a preset correspondence relationship between a ranging flight time and a gain of the photodetector and a preset correspondence relationship between a gain of the photodetector and the bias voltage, and the third preset time period is a ranging time period.

8. The lidar receiving apparatus according to claim 1, wherein when the transmitted laser signal is a pulse signal, the power control circuit is configured to output a control signal according to a predefined rule, and control a pulse bias voltage to be applied to the photodetector through the control signal.

9. The lidar receiving apparatus according to claim 1, wherein the preset flight time of the stray reflected signal is a statistical value of multiple measurement values of a flight time in a process in which a transmitted laser signal reaches the photodetector through a stray light path other than a ranging light path.

10. A lidar system, comprising:
 a lidar transmitting apparatus configured to transmit a laser signal, and
 the lidar receiving apparatus according to claim 1.

* * * * *